United States Patent [19]
Redlich

[11] 3,754,259
[45] Aug. 21, 1973

[54] OMNIRANGE NAVIGATION APPARATUS AND METHOD
[76] Inventor: Robert W. Redlich, 9 Grand Park Blvd., Athens, Ohio 45701
[22] Filed: July 22, 1970
[21] Appl. No.: 57,097

[52] U.S. Cl............... 343/102, 343/106, 343/106 D
[51] Int. Cl................................................. G01s 1/04
[58] Field of Search................ 343/106 R, 106 D, 343/102

[56] References Cited
UNITED STATES PATENTS
3,287,727  11/1966  Earp .............................. 343/106 D
3,448,453  6/1969  Earp et al. ..................... 343/106 D Primary Examiner—Benjamin A. Borchelt
Assistant Examiner—Richard E. Berger
Attorney—Irving M. Weiner

[57] ABSTRACT

An amnirange navigation apparatus and method wherein a reference signal is radiated and a ring antenna array radiates a variable phase signal which rotates bodily at a first frequency without physically rotating the array and which has sharp zero crossings. The measured phase between the received reference and variable signals is equal to the bearing between the transmitter and receiver. The receiver uses zero crossing techniques for phase measurement so that possible bearing errors which might be caused by reflected signals are reduced in direct proportion to the slope at the zero crossings.

11 Claims, 16 Drawing Figures

PATENTED AUG 21 1973

INVENTOR
ROBERT W. REDLICH

BY Irving M. Weiner
ATTORNEY

INVENTOR
ROBERT W. REDLICH
BY *Irving M. Weiner*
ATTORNEY

OMNIRANGE NAVIGATION APPARATUS AND METHOD

The present invention relates to an omnidirectional navigation apparatus and an omnirange navigation method. In particular, the invention relates to an omnirange system which includes the transmission of a variable phase pattern or signal having a relatively high slope at its zero crossings, and only one zero crossing for each half cycle.

BACKGROUND OF THE INVENTION

A VOR system, which signifies a very high frequency omnirange or a very high frequency omnidirectional radio range system, operates in the carrier frequency range of 112–118 megacycles per second, and provides a direct reading of the magnetic bearing between the transmitter and the receiver. The navigation signals are transmitted as a reference signal which is radiated omnidirectionally as 30 cycle per second sinusoidal frequency modulation on a 9,960 cycle per second subcarrier with a frequency deviation of ± 480 cycles per second, and a variable phase signal which is radiated from an antenna system that generates a figure 8 (sin $\theta$) pattern rotating at 30 cycles per second so that 30 cycles per second suppressed carrier amplitude modulation is received. The VOR receiver separates the reference signal from the variable signal, demodulates the signals, and measures the phase difference between the resulting 30 cycle per second sine waves. The measured phase is ideally equal to the bearing between the transmitter and the receiver.

Errors in the conventional VOR, i.e., differences between the actual and the indicated bearing, occur principally because of signals reflected from mountains, power lines, etc. Because these signals generally carry bearing information which is different than the nominally correct signal which is radiated from the antenna and the immediately surrounding terrain, the bearing indicated by the receiver will be in error by an amount depending on the magnitude of the reflected signal, the bearing of the reflecting source, and the radio frequency phase between the correct or direct signal and the reflected signal. The maximum possible bearing error is equal to the ratio of reflected to direct signals in radians. To achieve a maximum bearing error less than the maximum acceptable value of 2.5°, requires that the reflected signal be more than 27 decibels below the direct signal, which imposes stringent conditions on the site quality. As a result, in mountainous areas it may be impossible to find a suitable site.

Additional errors in VOR indication can occur when reflected signals are Doppler shifted in frequency by an amount approaching 30 cycles per second. If this happens, spurious audio in the neighborhood of 30 cycles per second appears at the radio frequency detector and enters the variable phase amplifiers, causing fluctuation in bearing indication.

Reflection errors can be reduced by "inverting" the VOR, i.e., transmitting the reference phase signal omnidirectionally as 30 cycles per second amplitude modulation, and the variable phase signal as a 9,960 cycle per second subcarrier frequency modulated with 30 cycles per second whose phase, relative to the reference phase, is equal to the azimuth angle. Such an inversion may be accomplished by a Doppler VOR which consists of a 45 foot ring of 50 loop antennas for radiating the variable phase signal, in addition to a single loop antenna at the center of the ring for radiating the reference phase signal. In the single sideband Doppler VOR, each of the 50 loop antennas is excited in turn by a carrier which is displaced by 9,960 cycles per second from the reference carrier, and a complete traverse of the ring is accomplished in 1/30th of a second. A continuous rotation of a single loop is approximated in this fashion, and the 30 cycles per second frequency modulation can be regarded as resulting from the Doppler effect. The reference and variable carriers beat to produce approximately the effect of a 9,960 cycle per second subcarrier upon radio frequency detection. Another version of the Doppler VOR uses two displaced carrier, one 9,960 cycles per second above the reference phase signal, and the other 9,960 cycles per second below the reference phase signal, to supply both subcarrier sidebands.

The Doppler VOR can substantially reduce reflection errors, but it is very expensive and complicated. On some difficult sites, even a Doppler VOR cannot reduce siting errors to an acceptable level. Furthermore, the Doppler VOR is vulnerable to disturbances caused by Doppler shifts in the frequency of the reflected carrier. The beat caused by a Doppler shifted reflected carrier enters the Doppler VOR reference channel, and produces exactly the same aberrations as it would in a standard VOR.

Aircraft using a VOR fly along radial tracks converging at the VOR transmitting site, This clearly limits the choice of route and leads to highly undesirable crowding near the VOR site. This has led to a current interest in using VOR in conjunction with distance measuring equipment to provide non-radial tracks. Such "area navigation systems" need VOR accuracies considerably better than the present standards to achieve relatively close aircraft separation with safety.

The foregoing observations on the present state of the VOR art are intended to show that a definite need exists for an improved VOR which preferably possesses the following characteristics: (1). Capable of reducing siting errors to the order of 0.5° on any site where a VOR is needed; (2) Compatible with existing VOR receivers; and 3. Which is relatively simple and inexpensive.

One experimental effort to fulfill the first of the above-listed characteristics is the so-called precision multi-lobe VOR. This system appears to be capable of generating precision VOR tracks, but it is complex, expensive, and necessitates extensive additions to the standard receivers in order for benefits of the precision signals or tracks to be realized.

The VOR system according to the present invention will meet all three of the above-listed characteristics or requirements. The main features or advantages of the present invention are: (1) No theoretical limit to the degree of error reduction which can be achieved; (2) Requires only one standard VOR transmitter, and changes in the transmitting station are such that any existing station can be converted at a very low cost; (3) Will operate existing receivers without modification, but to realize the benefits of increased accuracy, a minor receiver modification (estimated weight of one ounce) must be made in some cases, and a modified receiver will accept standard signals, and therefore it would be feasible to introduce the present invention gradually without any undue disruption of equipment now in use; (4) Will reduce errors caused by a Doppler shift in the reflected carrier, as well as those that would be experienced by a stationary receiver.

SUMMARY OF THE INVENTION

The present invention provides an omnidirectional navigation apparatus which comprises in combination, first means, such as a ring array of Alford loop antennas, for radiating a variable phase radiation pattern having substantially sharply defined zero crossings. The apparatus also includes second means, such as a VOR receiver employing zero crossing techniques for phase detection, for receiving and measuring the phase or time displacement between predetermined ones of the zero crossings to determine the bearing between the first means and the second means.

The present invention also provides an omnirange navigation method which includes the steps of generating an omnidirectional reference signal and a horizontally polarized variable phase polar signal having substantially sharply defined zero crossings with only one zero crossing for each half cycle. The method also includes radiating these signals from at least one ring antenna array disposed at a first predetermined location without physically rotating the ring antenna array. The method also includes the steps of receiving these signals at a second location, and measuring the phase difference between the received signals to determine the bearing between the first predetermined location and the second location.

There are approximately 900 omnirange or VOR stations in the United States, and many others throughout the world. The accuracy of existing VOR systems is generally inadequate for present and future needs involving reduced aircraft separation and area navigation systems. On some problem sites, such as Rikers Island in New York for example, a VOR system which is satisfactory even by present standards cannot be realized with the conventional or accepted VOR transmitting apparatus. An experimental system, the precision multilobe VOR, can substantially improve accuracy and alleviate siting problems, but it is complicated and expensive and requires major additions to existing receivers. A great need exists for a relatively simple and inexpensive VOR system which can reduce siting errors and improve VOR accuracy, and which can preferably be used by existing receivers without modification or with only simple modifications. The present invention is capable of filling this need.

In order to attain increased accuracy and reduced vulnerability to siting conditions, the present invention requires a minor modification of receivers not employing zero-crossing phase detectors, but either modified or unmodified receivers can accept either the standard VOR signals or signals radiated in accordance with the present invention. Therefore, the present invention could be introduced gradually without friction. The present invention is such that any existing VOR station could be converted at a very low cost, and this feature appears to be of special interest to aviation agencies throughout the world.

There is no theoretical limit to the accuracy attainable with the present invention. Increased accuracy may be attained with increased size and complexity. The present invention is adaptable to digital signal processing techniques which would reduce error assignable to the receiver.

BRIEF DESCRIPTION OF THE DRAWINGS

FIG. 1b depicts a summation of the direct and interfering signal wave forms which are shown in FIG. 1a.

DETAILED DESCRIPTION OF SOME PREFERRED EMBODIMENTS OF THE PRESENT INVENTION

The VOR system according to the present invention is an adaptation of a scheme which if carried out would theoretically produce a VOR system which would be virtually immune from reflection errors, but which would be impossible to realize in practice. The idealized scheme whould entail the replacing of the rotating sine wave variable phase pattern of a standard or conventional VOR system with a rotating square wave, and altering the receiver so that it would measure the time between the zero crossings of the reference phase signal and the variable phase signal.

Figure 1A:
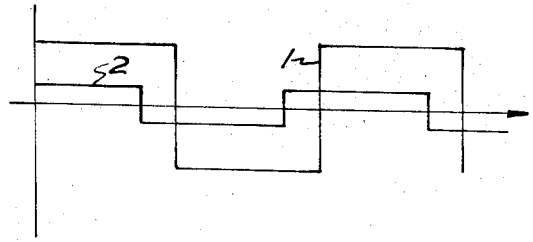
FIG. 1a illustrates a direct signal wave form and an interfering signal wave form plotted along the same coordinates.
Figure 1B:
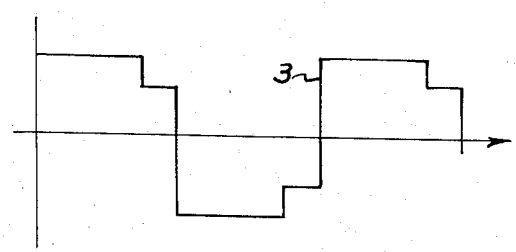

With reference to FIG. 1a and FIG. 1b, the ordinate axis represents the amplitude of the signals, whereas the abscissa axis represents time. In FIG. 1a, there is shown a variable phase direct signal 1 and an interfering signal 2. In FIG. 1b, there is shown the resultant signal 3 which is the combination or summation of the direct signal 1 and the interfering signal 2 shown in FIG. 1a. FIG. 1a and FIG. 1b show the effect on the variable phase direct signal of an interfering signal originating from a reflector at a bearing different than that of the receiver. From these drawings, it will be apparent that unless the interfering signal 2 exceeds the undisturbed direct signal 1, the zero crossing time for the resultant signal 3 remains unchanged from that of the undisturbed direct signal 1.

Figure 2:
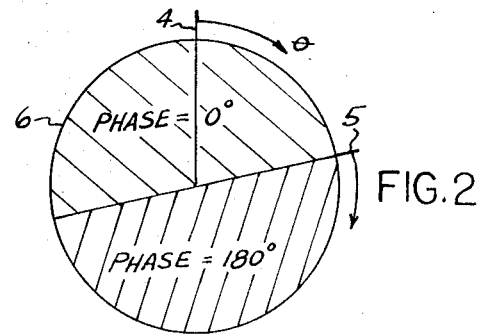
FIG. 2 illustrates a polar pattern of a variable phase antenna array that radiates a square wave.

The practical impossibility of realizing a rotating square wave variable phase signal can be better understood by referring to FIG. 2 which illustrates a polar pattern of a variable phase antenna array which radiates a square wave. In FIG. 2, the vertical line 4 represents the starting point for the azimuth angle represented by the symbol $\theta$. In FIG. 2, the line indicated by the reference numeral 5 represents a transition between the 0° phase and the 180° phase, and this transition rotates at a first predetermined frequency, for example, 30 cycles per second. The circular circumference 6 shown in FIG. 2 represents the constant amplitude of the polar pattern. The discontinuous transition in phase implies an infinite number of azimuth harmonics in the instantaneous polar pattern. At $t=0$, the polar pattern can be written out explicitly as the Fourier expansion of a square wave as follows:

$$P(\theta) = \sum_{n=0}^{\infty} \frac{1}{2n+1} \sin (2n+1)\theta.$$

It can be shown that, to radiate an azimuth harmonic of order N, i.e., sin N$\theta$, an array at least N wavelengths in circumference is necessary for reasonable radiation efficiency. Thus, an array of infinite size would be required for radiation of a true square wave.

Reduction in VOR errors can, however, be achieved in practice with an array that radiates an approximate square wave. If the VOR receiver employs zero crossing techniques for phase measurement, errors caused by interfering signals are proportional to the time displacement of the zero crossing, which, for small interfering signals, is given by $\Delta$ (zero crossing time) = amplitude of interfering signal/$(dP/dt)$ $t = 0$ Evidently, then, what is required for error reduction is a variable phase waveform with high slope at zero crossing, and only one zero crossing per half cycle. Conventional VOR uses only the first spatial harmonic (sin $\theta$) which has a normalized slope of 1.0 at zero crossing. Addition of the second term in the Fourier expansion of a square wave, namely, ⅓ sin 3 $\theta$, doubles the slope at zero crossing and will reduce errors by an approximate factor of two. Each additional term in the Fourier expansion adds one unit of slope at zero crossing, with corresponding error reduction. The ideal square wave has infinite zero crossing slope, hence no errors.

Additional azimuth harmonics need not have the amplitude of the corresponding square wave harmonic. To get the highest possible zero crossing slope for a given antenna aperture, the highest order harmonic should be accentuated as much as it can be without generating another zero crossing. An example of this is the following variable phase polar pattern, which will be used hereinafter for concrete illustrative purposes:

$P(\theta) = \sin \theta + 1/3 \sin 3 \theta + 3/5 \sin 5 \theta.$

Figure 4:
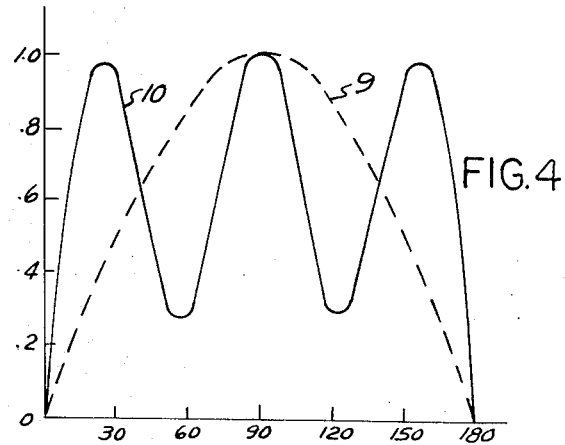
FIG. 4 illustrates the variable phase radiation pattern in Cartesian coordinates for a conventional VOR and for one embodiment of the present invention.
Figure 3:
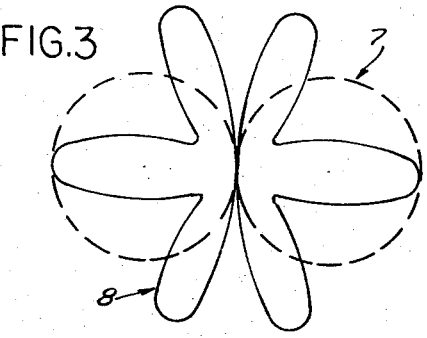
FIG. 3 shows a variable phase polar radiation pattern for a conventional VOR and also for one embodiment of the present invention.

The above exemplary pattern has a slope of 5.0 at zero crossing, and therefore will reduce errors by a factor of approximately five over a conventional VOR. FIGS. 3 and 4 show the above polar pattern, and FIG. 5 illustrates its error reduction as a function of relative bearing of an interfering reflector.

In FIG. 3, the curve designated by the reference numeral 7 is the variable phase polar radiation pattern of a conventional VOR, and the curve designated by the reference numeral 8 indicates the variable phase polar radiation pattern of the three harmonic above exemplary polar pattern according to the present invention.

In FIG. 4, the abscissa represents the azimuth angle in degrees, and the ordinate represents the magnitude of the variable phase radiation pattern in a horizontal plane. The curve designated by the reference numeral 9 is the variable phase radiation pattern of a conventional VOR, and the curve designated by the reference numeral 10 is the variable phase radiation pattern of the above exemplary three harmonic polar pattern according to one embodiment of the present invention.

Figure 5:
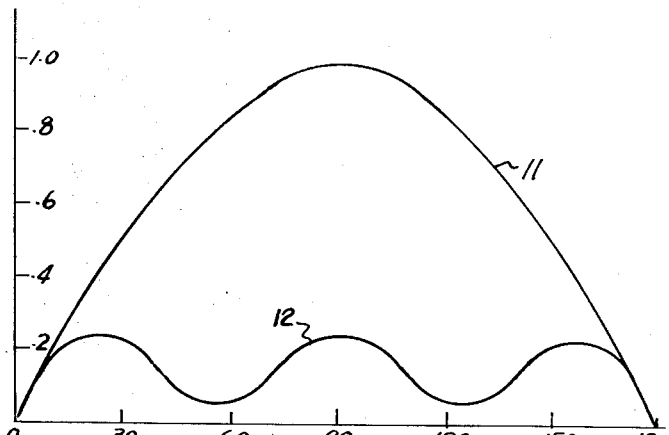
FIG. 5 depicts a graph of the bearing error for a conventional VOR and one embodiment of the present invention both employing the same reflector.

In FIG. 5, the abscissa represents the bearing of an interfering reflector, and the ordinate represents the magnitude of the relative error. The curve designated by the reference numeral 11 relates to the bearing error of a conventional VOR, and the curve designated by the reference numeral 12 relates to the bearing error of the three harmonic above exemplary embodiment of the present invention. In both cases, the same interfering reflector is employed.

According to a first embodiment of the present invention, the transmitting antenna array must have circular symmetry because $P(\theta)$ must rotate at 30 cycles per second without physical rotation of the array. It should radiate only a horizontally polarized signal because if vertically polarized signals are radiated, they will generally carry bearing information in spatial quadrature with the horizontally polarized signals, a situation which can lead to "polarization errors" during banked maneuvers. For practical reasons, the array should have the smallest size and the fewest elements necessary for radiation of the required pattern.

Figure 6:
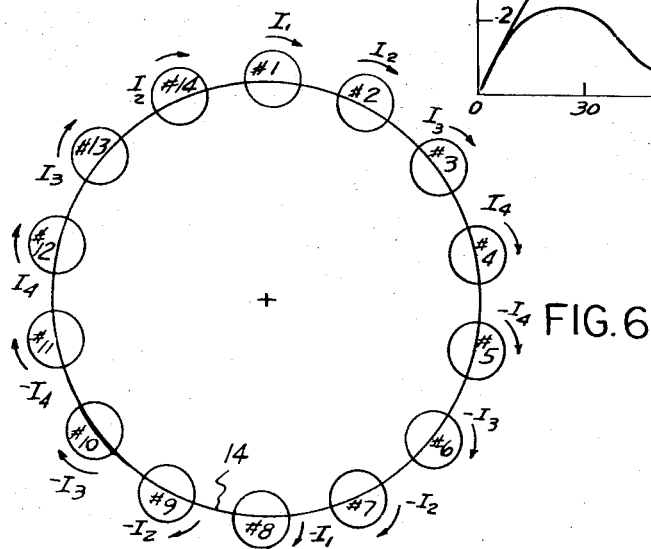
FIG. 6 shows a ring antenna array according to a first embodiment of the present invention for radiating a variable phase radiation pattern having substantially sharply defined zero crossings.

With reference to FIG. 6, array of Alford loop antennas 13 disposed on a ring 14 fulfills the polarization requirement, and approximately fulfills the requirement of circular symmetry. The theory of such an array is set out hereinafter in the section designated "Theory." The theoretical study yields (a) a procedure by which a ring array could be designed to radiate any specified pattern in the plane of the ring, and (b) criteria for minimum aperture and minimum number of elements.

FIG. 6 illustrates an array designed to radiate $P(\theta)$. It should be noted that, if error reduction greater than that given by $P(\theta)$ is required, a ring array which radiates a pattern with steeper zero crossing slope can be designed by the same method used to design the array shown in FIG. 6. The result will be an array with more elements disposed on a larger diameter ring. In general, theoretical criteria state that the minimum practical ring circumference in wavelengths is approximately equal to the order of the highest azimuth harmonic to be radiated, and the absolute minimum number of elements required for radiation of harmonic order $N$ is equal to $2N + 1$. The highest harmonic order to be radiated by the array of FIG. 6 is $N = 5$, hence a ring circumference of about five wavelengths, and an absolute minimum of 11 elements, are necessary. Fourteen elements were used rather than the absolute minimum of eleven to achieve a more accurate pattern synthesis, and more important, to reduce changes in pattern shape as the pattern is rotated electrically at 30 cycles per second. Use of a discrete, rather than a continuous, array results in a small error, azimuthally periodic, in zero crossing time. This error can be minimized by increasing the number of elements. The design shown in FIG. 6 has a bearing error (zero crossing time error) that is periodic with a period of 25.7° (360/14), and has a peak amplitude of about 0.1°.

Figure 7:
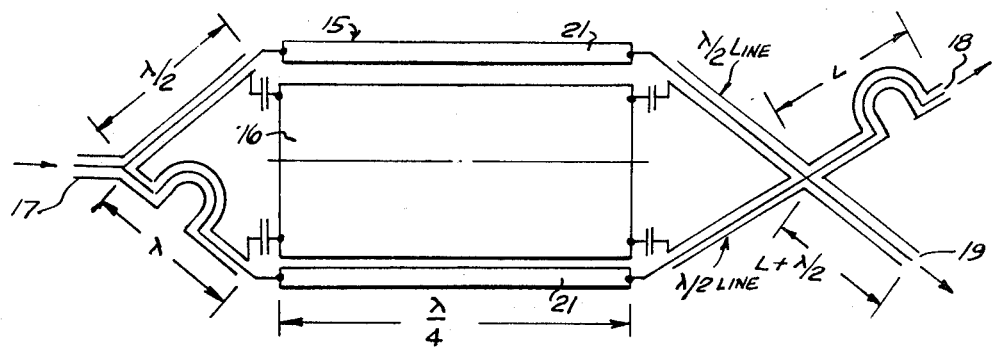
FIG. 7 illustrates in schematic form a mechanical modulator for use in conjunction with the ring antenna array of FIG. 6.
Figure 8:
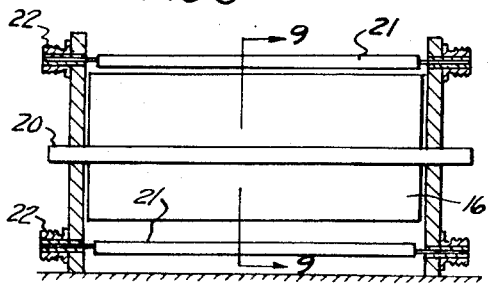
FIG. 8 illustrates an axial elevational sectional view of the modulator depicted in FIG. 7.
Figure 9:
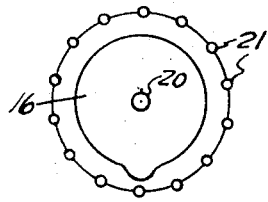
FIG. 9 shows a section of the mechanical modulator taken along the line 9—9 of FIG. 8.

In FIG. 6, each Alford loop antenna 13 is an omnidirectional loop antenna, and for a five wavelength ring circumference the currents $I_1$, $I_2$, $I_3$ and $I_4$ which are indicated in FIG. 6 have the following relationship: $I_1 = 0.008$ at 180°; $I_2 = 0.40$ at 0°; $I_3 = 0.32$ at 0°; and $I_4 = 0.08$ at 180°. Referring to FIGS. 7, 8 and 9, the function of the modulator 15 is change the currents in each of the loop antennas comprising the ring array so that the radiated variable phase pattern rotates bodily at 30 cycles per second. Pattern rotation could of course be accomplished directly by physically rotating the entire array, but this simple solution is ruled out by practical difficulties. FIG. 6 shows the currents in the array as they would exist at a particular instant of time, say $t = 0$. The modulator shown in FIGS. 7, 8 and 9 causes the currents in each of the array elements 13 to change continuously so that at $t = (1/30) \times (1/14)$ sec., the current in element number 2 is equal to that which existed in element number 1 at $t = 0$, etc. In general, the current in a particular array element 13 at time t represents a sampling of a continuous current distribution that would radiate the polar pattern appropriate to time t. If the number of array elements 13 sufficiently exceeds the theoretical absolute minimum, the polar pattern will rotate without significant distortion.

In the mechanical modulator shown in FIG. 7, there is provided a variable radius drum 16 which rotates at 30 cycles per second. At junction 17 in the lefthand portion of the schematic of the mechanical modulator 15, the radio frequency input is introduced into the modulator. In the upper righthand portion of the schematic at junction 18 the output is fed to the loop antenna element number 1. In the lower righthand portion of the schematic at junction 19 the output is fed to the loop antenna element number 8.

In FIG. 8, the axial elevational sectional view of the modulator 15, shows the variable radius drum 16 which is affixed to a central shaft 20 that rotates at 30 cycles per second. The modulator is also provided with fourteen equally spaced $\lambda/4$ rods 21 wherein both ends of each $\lambda/4$ rod fits into opposed radio frequency receptacles 22.

The sectional view of the modulator shown in FIG. 9 is taken along the line 9—9 shown in FIG. 8. FIG. 9 shows the fourteen equally spaced $\lambda/4$ rods disposed about the variable radius drum 16 which rotates at 30 cycles per second.

The modulator 15 illustrated in FIGS. 7, 8 and 9 is devised to eliminate disturbances of the variable phase radiation pattern caused by mutual coupling between elements 13 of the ring array. Elimination of mutual coupling effects is crucial to proper functioning of the array, since the elements 13 of the array are so closely spaced that their mutual impedance is about 40 percent of their self impedance. The modulator 15 effectively drives each element 13 of the array with a current source whose magnitude varies with time in a manner appropriate for pattern rotation at 30 cycles per second. Driving the antennas 13 with current sources means that the antenna currents, and hence their radiation fields, are independent of the terminal impedance of the antenna. The modulator exploits that fact that if a voltage source is connected to one end of a $\lambda/4$ line, the other end becomes a current source of magnitude inversely proportional to the characteristic impedance of the $\lambda/4$ line. In the modulator 15, fourteen rods $\lambda/4$ long surround a drum 16 rotating at 30 cycles per second. Each of the rods 21 and the surface of the drum 16 form a $\lambda/4$ line whose characteristic impedance varies with time, since the cross-sectional shape of the drum is not circular, but is designed to produce the required variation of characteristic impedance. All the lines are connected to a common voltage source, half through $\lambda/2$ lines, the other (diametrically opposite) half through $\lambda$ lines, so that all are driven by the same voltage magnitude, but the drive voltage of half the lines is 180° out of phase with the other half. The variable current sources thus formed at the output ends of the $\lambda/4$ lines are used in diametrically opposite pairs to cancel out the carrier component of current output, leaving only modulation sidebands. Cancellation of carrier is an important consideration because variable phase radio frequency energy in a conventional VOR transmitter is supplied from a "modulation eliminator" a low efficiency device which removes previously imposed reference phase modulation. Because of the low efficiency of the modulation eliminator, excessive transmitter power would be required if carrier was allowed to radiate from the variable phase array.

One of the novel features of the VOR described hereinabove is the use of a single ring array to radiate a variable phase pattern having a sharply defined zero crossing (high slope at zero crossing). The sharpness of zero crossing definition can theoretically be increased without limit by increasing the diameter and number of elements 13 of the ring array. If the VOR receiver uses zero crossing techniques for phase detection, errors in VOR bearings caused by reflected signals are reduced in direct proportion to slope at zero crossing. Receivers not using zero crossing techniques can readily be modified to do so.

The compatibility situation is exactly analogous to that of color TV and black and white TV. Either type of set can receive either type of signal, but only a color set can display color pictures. Analogously, either a conventional or a zero crossing type VOR receiver can use either standard signals or the semi-square wave signals according to the present invention, but only a zero crossing type receiver will benefit from the potential error reduction of the signals according to the present invention.

The advantages of the present invention are: Error reduction, theoretically to any desired degree; Relatively simple and cheap; Compatibility as outlined above; Existing stations could be converted at low cost; Adaptable to digital phase measurement; Unlike either conventional or Doppler VOR, it will reduce errors due to a Doppler shift in reflected carrier signal.

Figure 10:
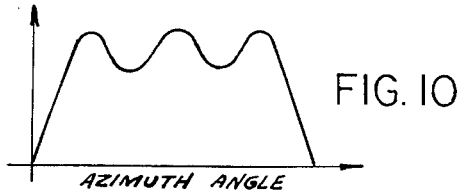
FIG. 10 shows a graph of the variable phase pattern amplitude radiated by the ring antenna array plotted against the azimuth angle at 0° elevation.
Figure 11:
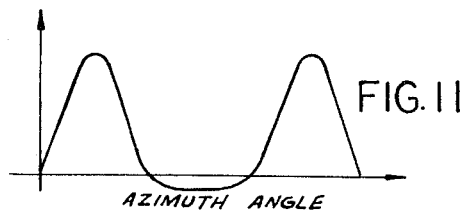
FIG. 11 shows a graph of the variable phase pattern amplitude radiated by a ring antenna array according to the present invention plotted against the azimuth angle taken at 45° elevation.

The variable phase pattern radiated by the antenna ring array described hereinabove may change with the elevation angle. Such possible changes with the elevation angle are illustrated in FIGS. 10 and 11, wherein the abscissa axis represents the azimuth angle, and the ordinate axis represents the pattern amplitude. FIG. 10 illustrates the situation which occurs at 0° elevation, and FIG. 11 illustrates the situation which occurs at 45° elevation.

Figure 12:
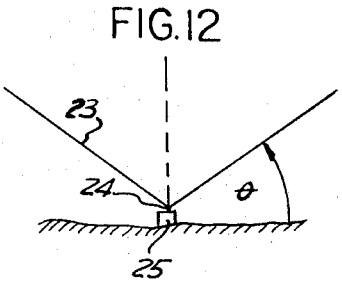
FIG. 12 illustrates a cone within which erratic indications may occur when the receiving aircraft is within the cone having its apex at the transmitting station.
Figure 13:
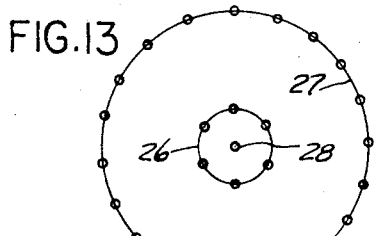
FIG. 13 illustrates a second embodiment of the ring antenna array according to the present invention for reducing the "cone of confusion" depicted in FIG. 12.

The spurious zero crossings may first appear at an elevation angle of approximately 40°, causing the pilot's indicator to oscillate erratically when his aircraft is within a cone 23 having its apex 24 at the transmitting station 25 (see FIG. 12). It is desirable to maximize $\theta$, that is, to minimize the "cone of confusion." A modification of the basic invention can accomplish this. Two such modifications of the present invention are illustrated in FIGS. 13 and 14.

The modification consists of using two concentric ring antenna arrays. In FIG. 13, the smaller antenna array 26 radiates only the 30 cycle per second component of the variable phase signal. The larger antenna array 27 radiates the remaining harmonics, and the size of the larger antenna array 27 depends upon the accuracy required. The reference signal would be radiated by the antenna 28 which is centrally located.

Figure 14:
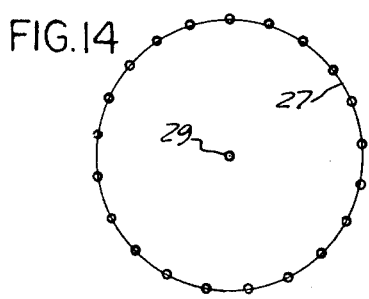
FIG. 14 illustrates a third embodiment of the ring antenna array according to the present invention for reducing the "cone of confusion" depicted in FIG. 12.

With reference to the embodiment of the invention shown in FIG. 14, the antenna structure 29 of an existing or conventional VOR would radiate the 30 cycle per second component of the variable phase signal and the reference signal. The larger ring array 27 would radiate the remaining harmonics of the variable phase signal.

The two alternate embodiments were modifications of the present invention which are described above and illustrated in FIGS. 13 and 14 cause the onset of any possible spurious zero crossings to be delayed until elevation angles of the order of 60° are reached.

THEORY

There will now be described a technique for synthesizing a ring antenna array which will radiate a prescribed pattern in the plane of the ring. The design is optimum in the sense of minimum ring diameter and minimum number of antenna elements for a special precision. The application of sampling theory to the development of a discrete array synthesis procedure yields a direct interpretation of results, such as minimum aperture and absolute minimum number of antenna elements. This synthesis technique is applied to the problem of designing a ring antenna array for aircraft navigation use.

If an antenna array is required to radiate a pattern specified through 360° of azimuth, one choice of geometry is a ring array, with elements uniformly spaced on a circle. In the following, a technique for synthesizing a ring array composed of elements that are omnidirectional in azimuth, e.g., vertical electric or magnetic dipoles, is developed. Sampling theory gives a simple perspective on results concerning minimum aperture and absolute minimum number of elements.

The general method used is as follows: (a) determination of a continuous distribution which will radiate the specified pattern; (b) sampling of the continuous distribution at equally spaced points and determination of the angular spectrum of radiation from the resulting discrete distribution; (c) deduction of criteria for minimum aperture and absolute minimum number of elements from the requirement that the discrete array radiate essentially the same angular spectrum as that of the specified pattern; and (d) determination of number of elements required to achieve a specified precision.

Suppose a continuous source distribution, given in Fourier form in terms of azimuth angle $\phi'$ as $$S(\phi') = \sum_{-\infty}^{\infty} a_n e^{jn\phi'} \quad (1)$$

exists on a circle of radius R. The array factor $P(\phi)$ in the plane of the ring is readily shown to be $$P(\phi) = 2\pi \sum_{-\infty}^{\infty} j^n a_n J_n(\beta R) e^{jn\phi} \quad (2)$$

where $\phi$ is azimuth angle.
If $P(\phi)$ is specified as
$$P(\phi) = b_n e^{jn\phi} \quad (3)$$

then the Fourier coefficients of $S(\phi')$ are, from (2), $$a_n = b_n / 2\pi j^n J_n(\beta R) \quad (4)$$

Specification of $P(\phi)$ then determines $S(\phi')$ through (4) and (1). If $S$, as determined by (4) and (1), is sampled at $N$ points with impulses of magnitude $2n/N$, the Fourier representation of $SS(\phi')$, the sampled distribution, is $$SS(\phi') = \left(1 + \sum_{m=1}^{\infty} e^{jmN\phi'} + e^{-jmN\phi'}\right) \sum_{n=-\infty}^{\infty} a_n e^{jn\phi'} \quad (5)$$

Identifying the harmonic coefficients in (5) with the coefficients in the general array factor of form (2) leads immediately to $PS(\phi)$, the radiation pattern of the sampled distribution.

$$PS(\phi) = P(\phi)$$
$$+ 2\pi \sum_{n=-\infty}^{\infty} \sum_{m=1}^{\infty} a_n (j^{n+mN} J_{n+mN}(\beta R) e^{j(n+mN)\phi}$$
$$+ j^{n-mN} J_{n-mN}(\beta R) e^{j(n-mN)\phi}) \quad (6)$$

To the extent that the terms in the double sum of (6) can be suppressed, $PS(\phi)$ can be made to approximate $P(\phi)$. Two variables are at one's disposal at this point; the number of sampling points $N$ and the ring radius $R$. If $P(\phi)$ is "band limited" at some integer harmonic order $\pm \gamma$, a choice of $N$ such that $$N > 2\gamma + 1 \quad (7)$$

will ensure that the repetitive angular spectra represented by (5) do not overlap. With this choice, radiation from the higher order spectra, represented by the summed terms in (6), can be suppressed by the following choice of $R$ $$\beta R \approx \gamma \qquad (8).$$

Since Bessel functions are small if their argument is smaller than their order, radiation from higher order spectra will be low compared to $P(\phi)$ if (8) is fulfilled. Furthermore, with the choice (8), $a_n$ for $n < \gamma$ will not be excessively high (*supergain avoided*).

In general $N = 2\gamma + 1$ represents a lower limit on the number of elements. To demonstrate this, suppose that a radiation pattern, band limited at $\pm \gamma$ is specified, thus fixing $2\gamma + 1$ Fourier coefficients of the ring distribution through (4). Radiation of harmonics outside the required band can be made small by choosing R according to (8). Let the amplitudes of $N$ equally spaced point sources on the ring be $A_m$. Then $A_m$ solutions of the set of linear algebraic equations $$a_n = \frac{1}{2\pi} \sum_{m=0}^{N-1} A_m e^{j\frac{2\pi mn}{N}} \quad -\nu \leq n \leq +\nu \qquad (9)$$

If $N < (2\gamma + 1)$, there are more equations than unknowns, hence no solution generally. The set (9) can be solved by recognizing that the inverse of the coefficient matrix is its conjugate times $1/N$, and the resulting $A_m$ values are identical to those obtained from the sampling procedure, provided $N > 2\gamma + 1$.

It will be noted that (8) is an approximation, not an equality. If $R$ is close to a zero of $J_n$, for any $n < \gamma$, (4) shows that $a_n$ will become very large, leading to an impractical drive distribution. For example, if $\beta R=7$, $J_1 (\beta R)=0.005$, and $\beta R$ must be shifted away from the zero of $J_1$ for a practically realizable distribution.

The precision required of the synthesized pattern determines the necessary number of elements. The error in the synthesized pattern is $PS(\phi) - P(\phi)$, and will be, approximately $$2\pi \, a\gamma J_{N-\gamma}(\beta R) \qquad (10)$$

where (10) is the dominant term in the higher order radiation pattern of (6). As N is increased abore $2\gamma + 1$, error decreases rapidly.

The analogy between the foregoing and time-domain sampling theory is clear; N playing the role of sampling rate, and R determining the cutoff frequency of an analogous imperfect low-pass filter.

The syntesis procedure can be illustrated by the following example. The pattern used as an example was required for an aircraft navigation device, and the need to synthesize it furnished motivation for the work presented here.

Example

Let $P(\phi)$ be specified as $P(\phi) = \cos \phi - 1/3 \cos 3\phi + 3/5 \cos 5\phi$. $P(\phi)$ is clearly band limited, with $\gamma = 5$. Thus $$\beta R \approx 5$$
$$N > 10.$$

As a start, choose $$N = 12, \beta R = 5.$$

Application of (4) after reference to tables of Bessel functions, gives the continuous excitation
$S(\phi') = j (0.50 \cos \phi - 0.148 \cos 3\phi' - 0.368 \cos 5 \phi')$.
The excitation of the discrete element p is calculated from $$I_p = 2\pi/N \, S(2\pi p/N).$$

Thus $I_0 = -I_6 = \pi/6 \, S(0) = -0.0084 j.$ $I_1 = I_{11} = -I_5 = -I_7 = \pi/6 \, S(\pi/6) = +0.392 j$ $I_2 = I_{10} = -I_4 \,' -I_8 = \pi/6 \, S(\pi/3) = +0.115 j$ $$I_3 = I_9 = 0.$$

Figure 15:
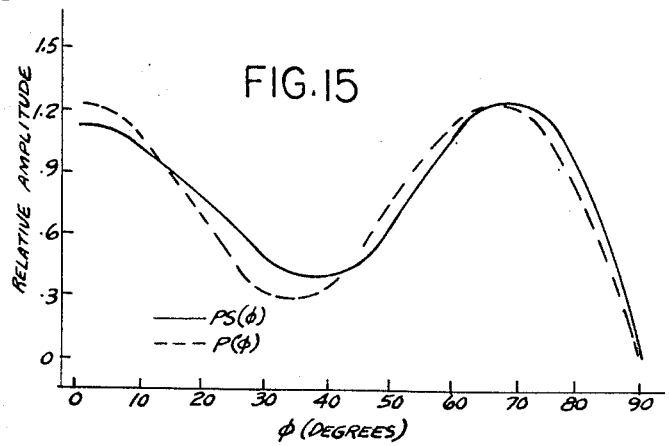
FIG. 15 illustrates a graph of the relative amplitudes of two different array factors plotted against the azimuth angle.

The array factor $PS(\phi)$ can be directly calcualted from the above excitations and compared with $P(\phi)$. From an elementary array theory
$PS(\phi) = 2j \, [ \, I_0 \sin (5 \cos \phi) + 2I_1 \sin (5 \cos \pi/6 \cos \phi)$
$\cos (5 \sin \pi/6 \sin \phi) + 2I_2 \sin(5 \cos \pi/3 \cos \phi)$
$\cos (5 \sin \pi/3 \sin \phi) \, ]$.
FIG. 15 shows $P(\phi)$ and $PS(\phi)$. The theoretical error in the synthesized pattern is the order of $2\pi \times (0.6) \times J_7 (5) \cos 7 \phi < 0.10 \cos 7 \phi \mathrm{ps}$ which checks well with $PS(\phi) - P(\gamma)$. If more accuracy is desirable, N can be increased. With $N = 13$, peak error is reduced by a factor of about three.

While the foregoing description sets forth the principles of the invention in connection with specific situations and apparatus, it is to be understood that the foregoing description is made only by way of example and not as a limitation of the scope of the invention as set forth in the accompanying claims.

I claim:

1. An omnidirectional navigation apparatus, comprising, in combination:
    first means for radiating a reference phase pattern and a variable phase radiation pattern having zero crossings at which the slope is greater than one; and
    second means for receiving and measuring the phase or time displacement between predetermined ones of said zero crossings to determine the bearing between said first means and said second means.

2. An omnidirectional navigation apparatus characterized substantially in accordance with claim 1, wherein said first means includes a transmitting antenna array which possesses circular symmetry and which radiates only a horizontally polarized signal.

3. An omnidirectional navigation apparatus characterized substantially in accordance with claim 1, wherein said first means includes a transmitting array of a predetermined number of omnidirectional loop antennas disposed in a circular pattern, and includes modulating means to change the currents in each of said omnidirectional loop antennas so that said variable phase radiation pattern rotates bodily at a first predetermined frequency without physical rotation of said transmitting array.

4. An omnidirectional navigation apparatus characterized substantially in accordance with claim 1, wherein said first means includes two concentric ring antenna arrays, one of said two concentric ring antenna arrays radiates only a first predetermined frequency component of said variable phase radiation pattern, and the other of said two concentric ring antenna arrays radiates the remaining harmonic components in said variable phase radiation pattern.

5. An omnidirectional navigation apparatus characterized substantially in accordance with claim 1, whereinsaid first means includes a transmitting ring antenna array and an omnidirectional antenna structure disposed at the center of said ring array, said omnidirectional antenna structure raidating a first predetermined frequency component of said variable phase radiation pattern, and said ring array radiating the remaining harmonic components in said variable phase radiation pattern.

6. An omnidirectional navigation apparatus characterized substantially in accordance with claim 1, wherein said first means includes at least one transmitting ring antenna array which radiates an approximate square wave having a relatively high slope at said zero crossings and only one zero crossing for each half cycle and wherein the highest order harmonic component is accentuated as much as possible without generating another zero crossing within each said half cycle.

7. An omnidirectional navigation apparatus characterized substantially in accordance with claim 1, wherein said first means includes at least one ring array of antenna elements having a minimum ring circumference in wave lengths which is approximately equal to the order of the highest azimuth harmonic to be radiated, and having a minimum number of said antenna elements required for radiation of harmonic order $N$ which is equal to $2N +1$.

8. An omnidirectional navigation apparatus characterized substantially in accordance with claim 1, wherein said first means includes a ring array of loop antenna elements which permit the ring array to radiate an omnidirectional reference signal and a variable phase signal, modulating means to change the currents in each of said loop antenna elements so that said variable phase signal rotates bodily at a first predetermined frequency and to eliminate disturbances of the variable phase signal which might be caused by mutual coupling between said elements of said ring array, and wherein said second means includes an omnirange receiver employing zero crossing techniques for phase detection.

9. An omnirange navigation method comprising the steps of:
generating an omnidirectional reference signal and a horizontally polarized variable phase polar signal having zero crossings at which the slope is greater than 1 and with only one zero crossing for each half cycle;
radiating said signals from at least one ring antenna array disposed at a first predetermined location without physically rotating said ring antenna array;
receiving said signals at a second location; and
measuring the phase difference between the received signals to determine the bearing between said first predetermined location and said second location.

10. An omnirange navigation method characterized substantially in accordance with claim 9, including the steps of modulating the currents in each antenna element comprising said ring antenna array so that said radiated variable phase signal rotates bodily at a first predetermined frequency, cancelling out the carrier component of the current output of said signals to leave only modulation sidebands, and employing zero crossing techniques for phase measurement of said received signals.

11. An omnidirectional navigation apparatus characterized substantially in accordance with claim 1, wherein: said first means includes modulating means and a plurality of antennas; said modulating means includes a common voltage source, a plurality of $\lambda/2$ lines, a plurality of $\lambda$ lines, a variable radius rotatable drum, a predetermined number of elements which are $\lambda/4$ in length surrounding said drum, and circuit means for connecting said modulating means to each of said antennas; each of said elements and the surface of said drum forms a $\lambda/4$ line whose characteristic impedance varies with time; the input end of half of said $\lambda/4$ lines is connected to said common voltage source through said $\lambda/2$ lines; the input end of the remaining half of said $\lambda/4$ lines is connected to said common voltage source through said $\lambda$ lines; and the output end of said $\lambda/4$ lines form variable current sources whoch are connected through said circuit means to said antennas in diametrically opposite pairs to cancel out the carrier component of current output leaving only modulation side-bands, so that said modulating means effectively drives each of said antennas with an associated one of said current sources whose magnitude varies in time in a manner appropriate to radiate said variable phase radiation pattern with a pattern rotation at a first predetermined frequency.

* * * * *